INVENTORS
DONALD H. JACOBS
MICHAEL MAY

BY Donald H. Jacobs

AGENT

Jan. 14, 1958 D. H. JACOBS ET AL 2,819,839

HIGH SPEED REGISTER USING GATING CIRCUITS TO BYPASS DELAY ELEMENTS

Filed Feb. 23, 1951 6 Sheets-Sheet 2

INVENTORS
DONALD H. JACOBS
MICHAEL MAY

BY Donald H. Jacobs AGENT

INVENTORS
DONALD H. JACOBS
MICHAEL MAY
Donald H. Jacobs
AGENT

INVENTORS
DONALD H. JACOBS
MICHAEL MAY
BY Donald H. Jacobs AGENT

INVENTORS
DONALD H. JACOBS
MICHAEL MAY
BY Donald H. Jacobs
AGENT

INVENTORS
DONALD H. JACOBS
MICHAEL MAY
BY Donald H. Jacobs
AGENT 2,819,839

HIGH SPEED REGISTER USING GATING CIRCUITS TO BYPASS DELAY ELEMENTS

Donald H. Jacobs, Brookdale, and Michael May, Chevy Chase, Md.; said May assignor to Donald H. Jacobs, Brookdale, Md.

Application February 23, 1951, Serial No. 212,447

18 Claims. (Cl. 235—61)

This invention relates to binary digital computers, and, more particularly, to any binary digital computer in which parallel addition methods are used. Parallel addition methods are those in which all digits of one number are added simultaneously to all digits of another number.

This invention comprises the addition of gating and control circuits, and appropriate connections, to a conventional binary computer accumulator register to produce a high speed binary accumulator register. A binary computer is one in which numbers having a radix of two are employed.

The object of this invention is to produce a modification of a conventional binary accumulator register which will allow the elementary arithmetic operations, i. e. addition, subtraction, multiplication, and division to be performed in a much shorter time than required in a conventional accumulator register.

The elementary arithmetic operations, as performed in a binary computer, comprise elementary additions, plus certain supplementary operations such as shifting the binary numbers within the registers, clearing the registers, and taking complements of certain binary numbers.

Therefore, more specfically, the object of this invention is to produce a modification of a conventional binary accumulator register which will allow an addition operation to be performed in a much shorter time than required in a conventional accumulator register.

For the sake of clarity in the description of this invention, certain conventional terms relating to binary digital computers are employed. The definitions of these terms will be found in patent applications 122,108, filed October 18, 1949; 122,109, filed October 18, 1949, and in Patent No. 2,706,247, dated April 12, 1955. A few additional terms will be defined as follows:

*Reaction time*.—The term reaction time will be used to denote the time following the triggering of any particular stage in a binary register during which that stage will be insensitive to a second trigger pulse. It will be designated $t_r$.

The lowest stage of a register will be defined as the stage in which the smallest digit is carried, i. e., the lowest denominational order. The highest stage is defined conversely.

Additional terms will be defined as needed to clarify the description.

An adequate description of the invention requires, first of all, an explanation of the type of register which is conventionally used for parallel addition. This explanation will be followed by a general description of the invention. Finally two specific embodiments of the invention will be described.

In the accompanying drawings illustrating the invention:

Figure 1:
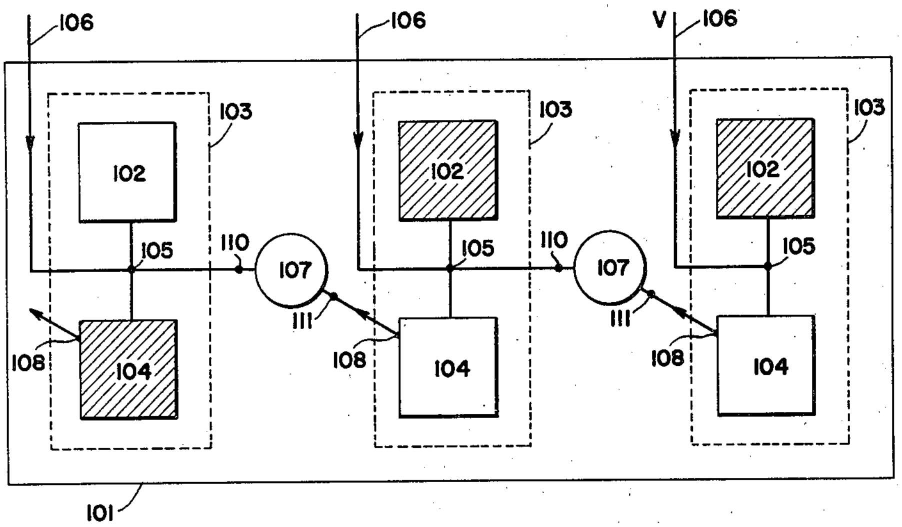
Fig. 1 illustrates a conventional binary accumulator register (of a digital computer) containing the binary number 011.

A type of electronic binary accumulator register conventionally used to perform parallel addition comprises a series of modified Eccles-Jordan type bi-stable circuits (such circuits are shown as 103*a* in Fig. 5) comprising two tubes each (or two tubes in a single envelope) and associated delay elements, or sometimes a relay or a plurality of relays. The operation of a modified Eccles-Jordan trigger circuit will be described to clarify the action of this part of a conventional vacuum tube register. The modified Eccles-Jordan trigger circuit has two stable states. One stable state is attained with one tube conducting and the other tube cut off. The other stable state is attained when the conducting tube has been cut off and the tube which was initially cut off has been made conducting. The two tubes have regenerative feedback connections so that once a change in state is initiated, the change continues until the other stable state has been reached. The conduction state may be changed from one tube to the other by triggering an input circuit common to both tubes with a negative pulse (or in some cases, a positive pulse). While the tubes are changing from one state to the other, the circuit is insensitive to further input pulses. Two pulses for triggering a modified Eccles-Jordan circuit must therefore be spaced in time by at least the time required to change the conduction states of the two tubes and then to permit the circuit to reach a static state. This time has been defined as the "reaction time" $t_r$. Each digit of a binary number may be represented (in a register) by the conduction state of a bi-stable circuit; one conduction state is regarded as representing the digit "0" and the other is regarded as representing the digit "1." This single circuit is called a stage. As conventially used in an accumulator register, each stage is connected to the following stage through a delay element, this being defined as a device of any type which emits an electrical signal at its output a predetermined time after the reception of an electrical signal at its input, typical examples being delay lines, time delay relays, or monostable mutivibrators. The stages in a register are arranged so that when any stage changes from the "1" state to the "0" state, a pulse is generated therein which passes through the adjacent delay element to the next successive stage. The delay element is necessary because of the fact that all stages may be triggered simultaneously in the parallel addition process and therefore the interstage carries (i. e. the carries from each stage to the next higher stage) must be delayed so that the following (next higher) stages may settle down and be ready to accept another trigger pulse before the carry pulse is fed in from the preceding stages. Since any stage may be triggered by an initial addition pulse, and any stage beyond the first then triggered again by a carry pulse, the delay time for the carry pulse must be at least as long as one reaction time. For the addition of two $n$-digit binary numbers, $n$ reaction times at most will be required, after the input of the parallel addition pulses, before another addition may be performed, because of the possibility of each carry pulse giving rise to another carry pulse.

In addition to the modified Eccles-Jordan type of accumulator register, other types of accumulator registers can be constructed. The other types include relay registers. The relay registers (in which relays are employed in place of electronic bi-stable circuits and also possibly delay elements) may be used in a manner similar to that described above for the Eccles-Jordan registers. The relay register requires essentially the same relative time (in terms of reaction times of the stages) to complete the addition process.

Figs. 1 through 4 show a conventional accumulator register 101 during an addition process. (The complete functionings of the static register, addition gates, and circuits connected thereto, during a conventional adding operation, are shown in Figs. 1–4 of patent application No. 122,109, filed October 18, 1949.) A typical form of register comprising modified Eccles-Jordan bi-stable circuits is shown in Figs. 1–4. Each bi-stable circuit 103 (see Fig. 5 for circuit details) comprises a tube 102 in which conduction is taken to represent a "1" for the corresponding binary digit and a second tube 104, in which conduction is taken to represent a "0" for the corresponding binary digit. (As is shown in Fig. 5, a few additional circuit elements are also used, but these are omitted in Figs. 1–4 for clarity.) Conduction will be indicated by shading the block representing the conducting tube. Point 105 is a common-input point for the bi-stable circuit 103. The parallel input pulse lines 106 (see Figs. 1–4 of the above-mentioned patent application for the origin of these lines) connect into the common input points 105. At the start of the addition process these lines 106 receive pulses corresponding to the "1" in the addend, as explained in the referenced patent application, in which the lines are designated 111*a*. The carry pulses produced (see below) are fed from the appropriate points 108 (also see Fig. 5) into the delay elements 107, and thence after the delay introduced by 107, into the common points 105 of succeeding stages.

An examination of the rules for binary addition will establish that register 101 is arranged to perform the binary addition function within the register. The rules are:

(1) 0+0=0
(2) *a.* 0+1=1
*b.* 1+0=1
(3) 1+1=0 plus a carry 1 to the following stage.

These rules are discussed further in the referenced patent applications.

Each bi-stable circuit in register 101 satisfies these three rules since each bi-stable circuit is arranged to trigger from one state to the other state upon receiving a pulse from either the parallel input line 106 or from the carry delay element 107. Each bi-stable circuit is arranged to generate a carry pulse if the state is changed from "1" to "0." The carry pulse is fed through a delay element 107 into the input point 105 of the following stage via line 110.

Figure 2:
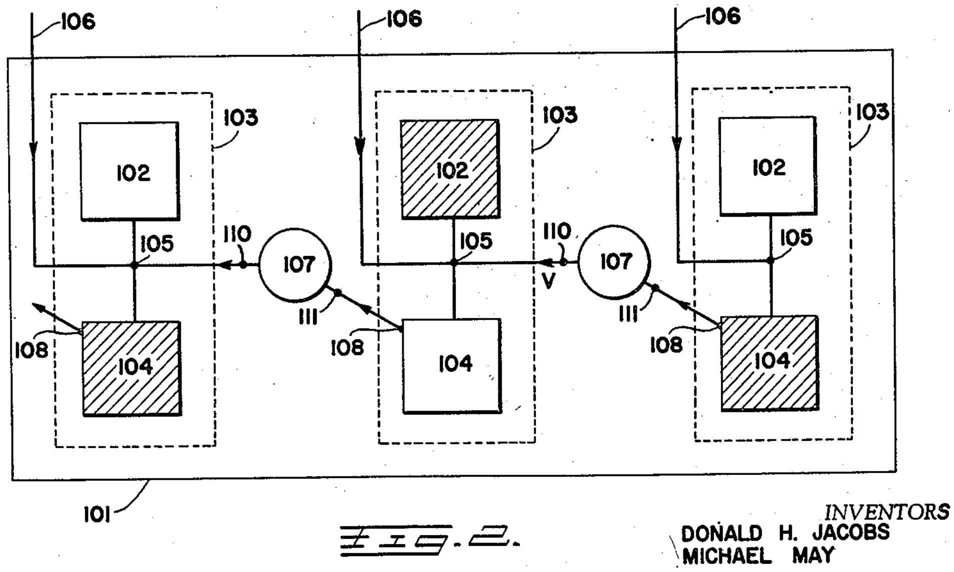
Fig. 2 shows the initial effect on the accumulator register of adding the binary number 001 into the above-menioned accumulator register.
Figure 3:
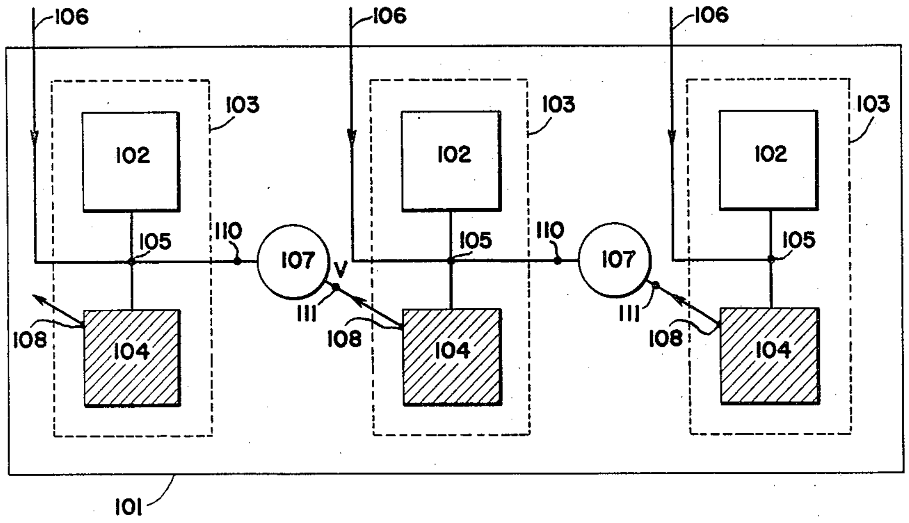
Fig. 3 shows the state of the above-mentioned register a short time later.
Figure 4:
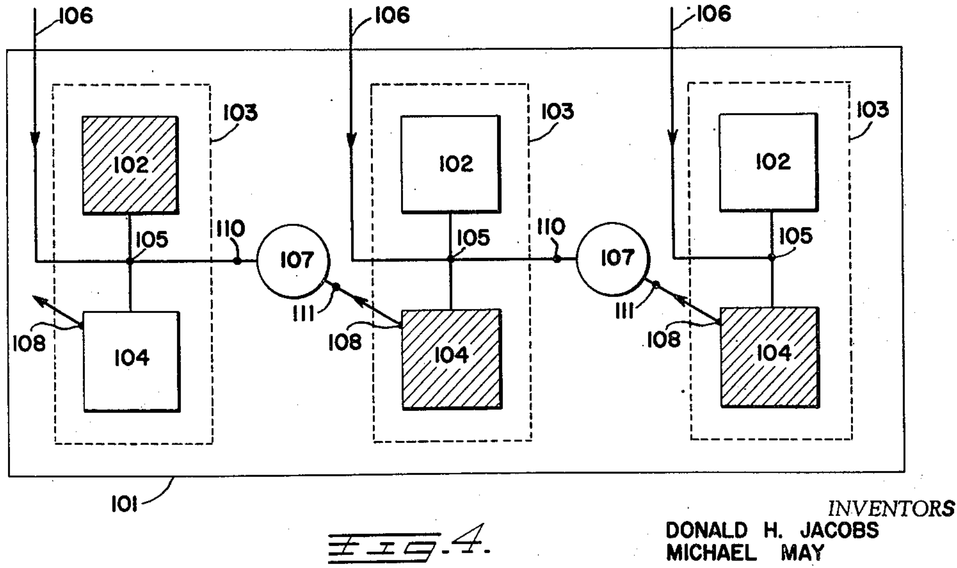
Fig. 4 shows the final effect of the addition operation on the above-mentioned accumulator register.
Figure 5:
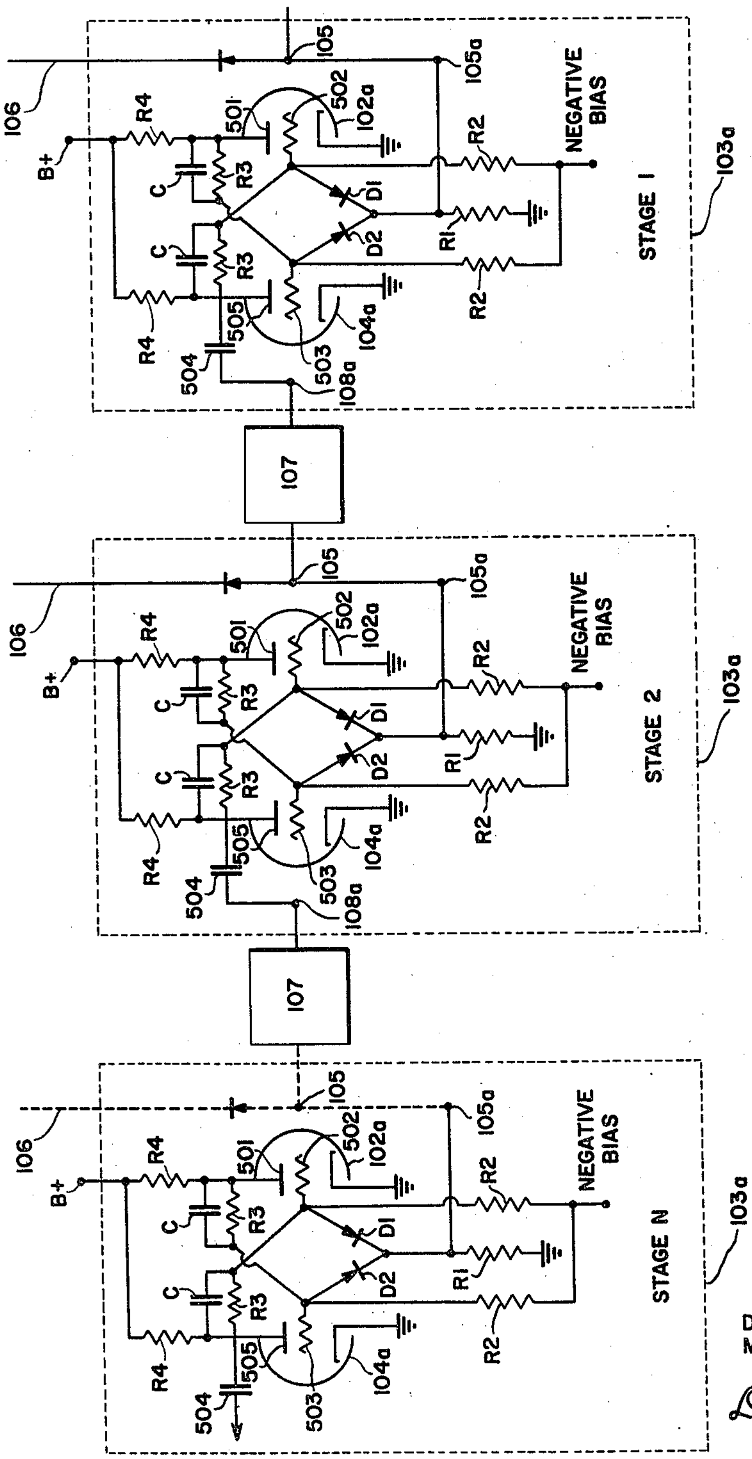
Fig. 5 illustrates a conventional electronic embodiment of an accumulator register.

The successive steps involved in performing an addition of the binary number 001 to the binary number 011 are shown in Figs. 1, 2, 3, and 4. Fig. 1 shows the register before the addition process. The register is indicating 011. Fig. 2 shows the result of adding the number 001 into the parallel addition input lines 106. Figs. 2 and 3 show the progress of the carry pulse, whose location is shown as V. Fig. 4 shows the final state of the accumulator register 101 in which the correct sum, the binary number 100, is found. The process is explained in detail, step by step, in patent application 122,109, filed October 18, 1949.

In the foregoing description, the conventional method of performing the parallel addition operation has been briefly outlined and it has been shown that an interval as long as $n$ register reaction times may be required to complete the addition of two binary numbers, each containing $n$ digits.

The following description will explain the construction and application of the invention which comprises two gating circuits per stage, of any type known to the art, with the conventional accumulator register shown in Figs. 1 through 4, to produce a high speed register requiring far less time to complete an addition than is required by a conventional accumulator register. It will subsequently be shown that the invention may be advantageously applied to any type of accumulator register known to the art which fulfills certain specifications.

In order to describe the operation of the invention it will first be necessary to discuss briefly the production of carry pulses by the modified Eccles-Jordan type of bi-stable circuit.

Figure 6:
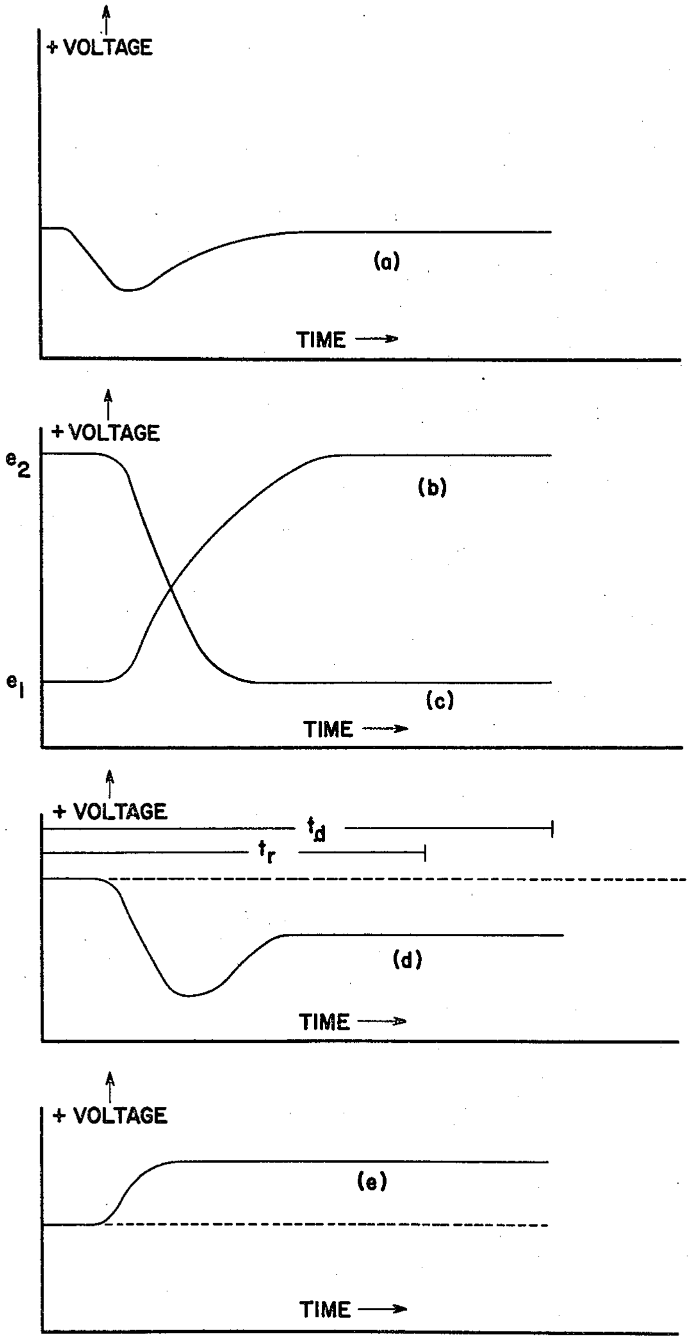
Fig. 6 illustrates the voltage waveforms at various points in one stage of the register shown in Fig. 5, when the state of the stage is changed from indicating a "1" to indicating a "0". L

There are many variations of the Eccles-Jordan type of bi-stable circuit. One particular variation is shown as 103*a* in Fig. 5. The waveforms shown in Fig. 6 are typical waveforms for all the various types. The application of the invention is not confined to the particular variation shown in Fig. 5, nor even to electronic circuits.

In relating the waveforms in Fig. 6 (in which the abscissas are time, and the ordinates represent voltage) to the modified Eccles-Jordan bi-stable circuit 103*a*, shown in Fig. 5, let it be assumed first that tube 102*a* (shown in Fig. 5 as one-half a double triode, but it, and 104*a*, may be separate tubes) is conducting and that its conduction state represents a "1." Thus tube 104*a* is cut off. The voltage at the plate 501 of tube 102*a* will be $e_1$ and at the plate 505 of tube 104*a* the voltage will be $e_2$, and $e_2$ will be greater than $e_1$. If a typical trigger pulse, as shown in Fig. 6(*a*), is applied at the common input point 105 (Fig. 5), the tube 102*a* will be cut off, and the tube 104*a* will thereby be made conducting. During this switching process, the waveforms at plates 501 and 505 will appear as shown in Figs. 6(*b*) and 6(*c*) respectively. The waveform at grid 502 will appear as shown in Fig. 6(*d*) and at grid 503 as shown in Fig. 6(*e*). After the circuit has settled down, plate 501 will be at $e_2$ volts and plate 505 at $e_1$ volts. The bi-stable circuit will now be indicating a "0" state. Thus a "1" has been added to a "1" in this operation, and the stage has been left in the "0" state; therefore, according to the rules of binary addition, a carry must have been generated and must be fed into the next higher stage (i. e. the next higher digit) through a delay element 107. The circuit 103*a* shown in Fig. 5 requires a negative trigger pulse, and the delay elements generally used do not invert the delayed carry signal. Therefore, the carry pulse must be derived from plate 505 since this was the plate whose potential decreased during the transition. The usual method of deriving this carry pulse is to differentiate the waveform at plate 505 by means of a coupling condenser 504 which is connected to the succeeding delay element 107 as shown in Fig. 5. It is evident that a delay element which produces a signal opposite in polarity to the applied signal could also be used, in which case the carry pulse would be derived from plate 501 rather than 505.

After being triggered, the bi-stable circuit 103*a* cannot be practically triggered again until the voltages at the grids 502 and 503 have again attained a steady state. The required time for this to occur is the time which was defined as the reaction time, $t_r$. This time fixes the magnitude of the delay time which must be introduced by the delay elements 107 in Fig. 5, as the time of this delay must be equal to or greater than the reaction time $t_r$. The delay time will be denoted as $t_d$.

Suppose now that a number is added by a parallel addition method to a number held in a register comprising stages similar to those shown in Fig. 5. Some stages may produce carry pulses (in changing from 1 to 0 states). These carry pulses will be temporarily held in the delay elements 107. After a time $t_d$ has elapsed, all stages 103*a* will have recovered from the initial addition process and will be ready to receive said carry pulses. Now the carry pulses emerge from the delay elements 107. Should a carry pulse change a stage 103*a* from a "1" to a "0" state, this stage itself will produce a carry pulse. However, this stage cannot have produced a carry pulse during the first addition process since it either was changed from a "0" state to a "1" state or was left in a "1" state in that process. It follows that no stage can receive or emit more than one carry pulse during a complete addition. Therefore a carry pulse which is emitted from a stage as a result of this stage being triggered by a carry pulse from the preceding stage does not need to be delayed, but could be routed around the delay elements if means were provided to do this. The result is a saving in addition time equal to nearly as much as $n-2$ delay times or nearly $(n-2)t_d$ where $n$ is the total number of stages in the register. This maximum saving occurs when a "1" is added to a register indicating "1" in every stage but the highest.

Figure 7:
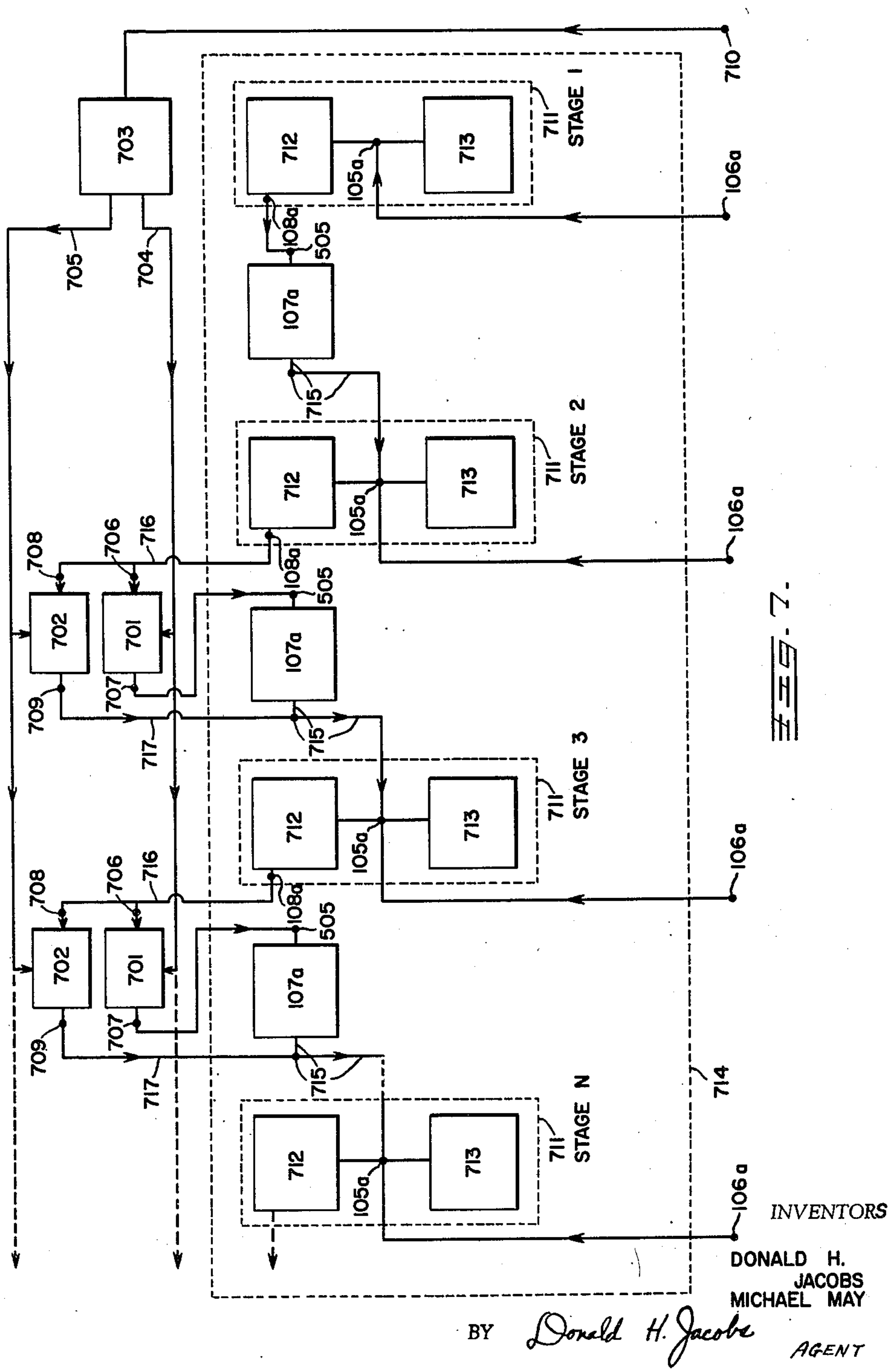
Fig. 7 illustrates the invention, which comprises a conventional type of accumulator register and two conventional gating circuits, together with a gate control circuit.

The invention is shown in Fig. 7 (which also contains a register 714 comprising several bi-stable stages 711, each of these stages comprising the physical elements (712, 713) of the stable states) and comprises the addition of two gating circuits 701 and 702 (which may be of any desired type) between each intermediate stage and the next higher stage, i. e., between each two successive stages (except the lowest two successive stages) of an accumulator register 714 (which is conventional, i. e. similar to that shown in Fig. 1, except for the obvious changes in wiring required to connect the invention to this register) together with a gate control circuit 703. The gate control circuit 703 is so arranged that if one group of gates (those designated 701) is conducting, the other group of gates (those designated 702) will be non-conducting, and vice versa. There are two satisfactory methods of utilizing the invention. The constructional difference in the two methods concerns only the conducting states of gates 701 and 702 and the timing of the gate control circuit 703.

The first of said methods is as follows: The gate control circuit 703 is so designed that (1) all the gates 701 normally permit pulses appearing on the pulse input points 706 (from carry point 108*a*) to appear at the gate output points 707 with relatively high amplitude, and (2) all gates 702 normally greatly attenuate pulses appearing at input points 708. But when a signal is applied to line 710, the control circuit 703, after a short delay $t_g$ (whose value is less than $t_d$) which may be generated therein, causes gates 701 to greatly attenuate pulses, and gates 702 to pass pulses and thus permit the carry pulse to appear at the gate output point 709. It is necessary that the time $t_g$ be long enough to assure that the carry pulses will be transmitted through gates 701. It is also necessary that the switching (i. e. gating) action must occur before the carry pulses emerge from the delay elements.

The signal to actuate the gate control circuit 703 may be supplied on line 710 simultaneously with the parallel addition pulses on lines 106*a*, in which case the time delay $t_g$ must be incorporated in the gate control circuit, or alternatively this gate control signal may be applied to line 710 at a time $t_g$ after the parallel addition pulses appear on lines 106*a* in which case the time delay $t_g$ is not incorporated in 703. After the completion of the addition operation, the gates 701 and 702 are returned by the gate control circuit 703 to the normal condition to await the next addition operation.

The gate operation initiated by gate control circuit 703 affects the carry pulses passing between all pairs of stages except the carry pulses between the two stages representing the two lowest digits (i. e. between stages 1 and 2). Any carry pulse emitted from stage 1 at point 108*a* enters delay element 107*a* via line 505. It emerges from delay element 107*a*, after a time $t_d$, along line 715 and arrives at the common input point 105*a* in stage 2.

The result of the gating operation (initiated by gate control circuit 703) on the carry pulses passing between any two stages (except the first two) is as follows: When addition is initiated, the parallel addition pulses are conducted into the accumulator register stages on lines 106*a* and the resulting carry pulses (this is the first set of carry pulses) are conducted from points 108*a* via lines 716 and 706 through gate 701, which is in a conducting state. They cannot get through gate 702, which is non-conducting. They emerge from gate 701 on line 707 and enter the delay elements 107*a* at points 505. They emerge therefrom via lines 715 and enter the next higher stages at the common input points 105*a*.

After a time $t_d$ (the delay time of 107*a*) the carry pulses emerge from the delay elements 107*a* and produce additional carry pulses (the second set of carry pulses) in the next higher stages. Because the gate switching time $t_g$ is shorter than the delay time $t_d$, by the time the first set of carry pulses enters the next higher stages the gates 701 and 702 have been switched (i. e., have had their conduction states reversed by gate control circuit 703) so that the second set of carry pulses (i. e. the carry pulses produced by the first set of carry pulses) are propagated from their respective stages via lines 716 and 708 through gates 702. They emerge therefrom at points 709 and are propagated along lines 717, into the next higher stages at the common input points 105*a*. Hence this second set of carry pulses does not pass through the delay elements 107*a*. The same statement applies to any consequent set or sets of carry pulses. Thus, the invention permits the addition operation to be completed in less than the normal $n$ delay times required in a conventional accumulator register of $n$ stages. The saving is approximately $(n-2)t_d$.

The second method of utilizing the invention involves the operation of gates 701 and 702 of Fig. 7 in a different order to the first described method. In this case the sequence of operations when adding two numbers is as follows: The gates 702 of Fig. 7 are normally conducting and the gates 701 are normally non-conducting. When a number is to be added to the number in register 714, a pulse is first applied to line 710. This causes the gate control circuit 703 to reverse the normal conducting states of the gates 701 and 702 and thus causes 701 to conduct, and 702 to be non-conducting. This change of conducting state takes a time $t_g$. After the elapse of a time $t_g$ the parallel addition pulses are caused to appear on lines 106*a* in the conventional manner described in patent application 122,109, thus causing those stages which receive a pulse to change their states. Those stages which were changed from a "1" to a "0" state emit carry pulses (at points 108*a*) which pass into the delay elements 107*a* via gates 701 which are now in their conducting states, as described above. After a sufficient time has elapsed to allow these carry pulses to enter (but not leave) the delay elements, the gate control circuit 703 causes the conducting states of the gates 701 and 702 to return to their normal states, i. e., gates 702 are now conducting, and gates 701 are non-conducting. Thus when the carry pulses issue from the delay elements 107*a* the gates 702 are conducting. If now a carry pulse changes any stage 711 from a "1" to a "0" state, then the said stage will emit a carry pulse itself via point 108*a*, point 708, gate 702, and line 715 to the next higher stage. It will be seen that, as before, only the first set of carry pulses are delayed in the delay elements 107*a*. Carry pulses which are produced as the result of a stage being changed from a "1" to a "0" state by a carry pulse, are not delayed.

As in the first method of utilizing the invention, the gate operation initiated by gate control circuit 703 affects the carry pulses passing between all pairs of stages except the carry pulses between the two stages representing the two lowest digits (i. e. between stages 1 and 2). Any carry pulse emitted from stage 1 at point 108a enters delay element 107a via line 505. It emerges from delay element 107a, after a time $t_d$, along line 715 and arrives at the common point 105a in stage 2.

The results of the gating operation are (as in the first method of utilizing the invention) to delay the first carry pulses (i. e. the first set of carry pulses) and to bypass the carry delay elements 107a for all subsequent carry pulses. Also (as in the first method of utilizing the invention) the time saved by the invention is approximately $(n-2)t_d$.

Fig. 7 is applicable to either the first or second method of utilizing the invention.

In the first method of utilizing the invention the gate control circuit 703, which is actuated a time $t_g$ after the beginning of an addition, causes gates 702 to be conducting and gates 701 to become non-conducting, and maintains the gates in these respective states until the addition has been completed. When the register is in a quiescent state, gates 702 are non-conducting, and gates 701 are conducting.

In the second method of utilizing the invention, gates 702 are normally in a conducting state and gates 701 are normally kept in a non-conducting state. They are kept in these states by gate control circuit 703. When an addition is initiated with this method, gate control circuit 703 first reverses the normal conduction states of gates 701 and 702, and at a time $t_g$ thereafter the addition pulses are permitted to appear on lines 106a. This latter step is accomplished in the conventional parallel fashion of adding as described in patent application No. 122,109. Gate control circuit 703 keeps the states of conduction of the gate circuits 701 and 702 reversed for a time sufficiently long to permit the first set of carry pulses to enter their respective delay elements (via gates 701), and then returns these gates to their normal states prior to the issuance of the first set of carry pulses from the delay elements.

A pair of gates 701—702 can be placed between the first and second stages in either of the above-described methods of use for the sake of uniform construction.

Adequate descriptions of possible internal constructions of the blocks in Fig. 7 may be found in the book, "Waveforms," by Chance et al., Radiation Laboratory Series, vol. 19 (McGraw-Hill, New York).

Possible circuits and circuit interconnections for the first method of utilizing the invention are as follows: The gate control circuit 703 in Fig. 7 may be of the type shown in Fig. 5.10 on page 168 of this book, where it is called a "monostable multivibrator."

The voltage-time characteristics of this circuit, which are shown in Fig. 5.11, page 169, are suitable for the actuation of electronic gates. For example the plate voltage-time characteristics (of $V_1$ and $V_2$), shown in Fig. 5.11, could be used to operate gates 701 and 702 respectively of Fig. 7 of the specification. These gates 701 and 702 can comprise circuits of the form shown in Fig. 10.16 on page 379 of the above reference. Line 716 of Fig. 7 could be connected to the point marked "signal input" of the circuit and the plate of tube $V_1$ of the "monostable multivibrator" (Fig. 5.10) could be connected by line 704 to the point marked "selector pulse" in Fig. 10.16 of the above reference. Fig. 10.16 now represents gate 701 of Fig. 7. Similarly, the plate of tube $V_2$ of Fig. 5.10 is connected by line 705 to the point marked "selector pulse" in Fig. 10.16, the circuit of Fig. 10.16 now forming gate 702 of Fig. 7. By using one plate of the "monostable multivibrator" (Fig. 5.10, page 168) to control gate 701 of Fig. 7 and the other plate to control gate 702 of the same figure, one gate will be open when the other is closed as is required in the description of Fig. 7. Suitable D.-C. bias must be applied at $Eg_3$ in Fig. 10.16 of the cited reference. The blocks labeled 711 in Fig. 7, and comprising stages 1, 2, 3, and $n$, may conveniently each comprise a circuit such as that shown in Fig. 5.6 on page 166 of the cited reference. This type of circuit is called a "bistable multivibrator." The line 106a of Fig. 7 would be connected to the point marked "input triggers" in Fig. 5.6 of the reference. The lines 716 of Fig. 7 might be connected to the right hand plates of the tubes shown in Fig. 5.6. The other ends of these lines can be connected to the point marked "signal input" in Fig. 10.16 of the reference, this figure showing the circuit useable in blocks 701 and 702 of Fig. 7.

The delay element 107a may comprise the "monostable multivibrator" already referred to in the cited reference. This "monostable multivibrator," shown in Fig. 5.10, has its plate $V_2$ connected to the point marked "input triggers" in Fig. 5.6 of the cited reference which represents points 105a in the next higher stage 711 of Fig. 7. The point marked "selected output" in Fig. 10.16 of the reference (corresponding to points 707 in Fig. 7) is connected to the point marked "input trigger" in Fig. 5.10 of the reference, this point corresponding to points 505 in Fig. 7.

It is possible, in order to invert the negative pulse issuing from bi-stable circuit 711, to insert a pulse transformer and other circuit elements between points 108a and lines 716.

The second method of utilizing the invention involves the employment of the same circuits as were described above for the first method of use. Some slight changes in interconnections are involved because of the different method of using gate control circuit 703 to change the conduction states of the gate circuits. The same type of circuit as described under the first method of use is employed for gate control circuit 703. The plate of tube $V_2$ (Fig. 5.10 of the cited reference), however, is connected to line 704 in this second method of use, and the plate of $V_1$ is connected to line 705. With the second method of use, the gates may (as before) comprise circuits of the type shown in Fig. 10.16 of the cited reference. The D.-C. bias voltage applied at point $Eg_3$ in Fig. 10.16 is so adjusted that gates 702 are normally conducting, and gates 701 are normally non-conducting. All other circuits and connections employed in the second method of use of the invention are similar to those employed in the first method of use.

The application of the invention is not limited to an accumulator register utilizing modified Eccles-Jordan type (bistable multivibrator) circuits, but can involve the use of various other circuits which can perform similar functions.

Figure 8:
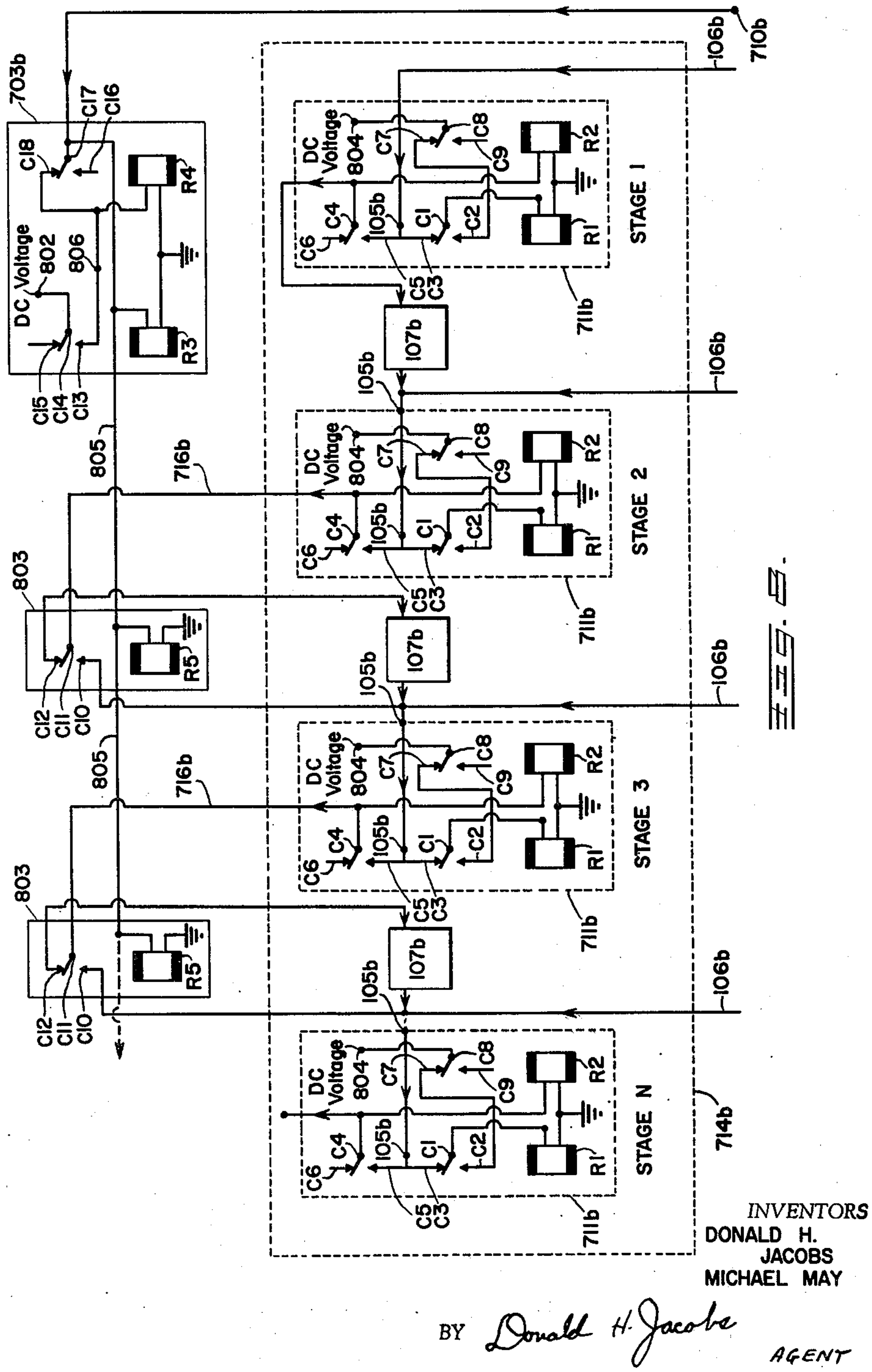
Fig. 8 illustrates a specific embodiment, employing relays of the invention illustrated in Fig. 7.

The blocks of Fig. 7 can represent other than purely electronic devices. For example a high speed binary accumulator register using relay bi-stable circuits is shown in Fig. 8. This shows only one specific embodiment of the invention and only one type of relay accumulator register The relay bi-stable circuit shown in Fig. 8 utilizes a common type of relay (whose normal (i. e., coil deenergized) position is as shown in the figure) and an electrical latching circuit. An electro -mechanical latching relay could just as easily be used. All the relay contacts shown above the relay coils in Fig. 8 are operated by that coil. The figure shows their positions when the coils are not energized.

In order to clarify the operation of the relay embodiment of the invention, a brief explanation must first be given of the action of one of the relay bi-stable circuits 711b in the accumulator register 714b in Fig. 8. The suffix $b$ will be used to relate points in this specific embodiment with corresponding points in the generalized diagram, Fig. 7. The stages are shown in the "0" state. Now if a pulse were received by stage 1, at point 106b, of sufficient amplitude and duration to energize momentarily relay coil R1 via contacts C3 and C1, then a circuit would be closed thereby through C1 and C2, and through C7 and C8, to the D.-C. voltage at point 804, thus causing R1 to remain energized and indicate a "1" at point 801 by the presence of the D.-C. voltage. A circuit through C4 and C5 is also connected by the same process so that the next input pulse at point **106*b* is routed through C5 and C4 into relay coil R2 so that this input pulse will momentarily energize relay coil R2. This action momentarily opens contacts C8 and C7, causing an interruption to the D.-C. voltage energizing the coil of relay R1. When the pulse is completed R2 also becomes deenergized and the circuit is back in the "0" state. In accordance with the rules of binary arithmetic, the circuit should produce a carry in changing from the "1" to the "0" state. This is accomplished by connecting the carry line 716*b*** to C4 so that the circuit C4—C5 is closed when the stage indicates a "1." The next input pulse is then fed straight through C5—C4 simultaneously with the initiation of change of state.

The operation of the gates and gate switching circuit will now be outlined.

R5 is a slow acting relay which is so adjusted that the carry pulse is propagated into the delay element **107*b*** before the circuit C11—C12 is broken. R4 is also a slow acting relay which is so adjusted that it breaks the circuit C17—C18 only after the elapsing of the time required for a complete addition operation. R3 is not required to be a slow acting relay. The relays are shown diagrammatically as ordinary relays, however, it should be evident that these relays may have any desired combination of slugs, resistances, inductances, and capacitances in circuit therewith to produce the desired slow acting characteristic in any manner known to the art.

A signal may be applied to line **710*b* at the same instant that the parallel addition signals are applied to points 106*b*. This signal energizes momentarily relays R3, R4, and R5, and causes contacts C10 and C11 to close after a suitable time delay, and causes contacts C13 and C14 to close immediately. However when the contact C14—C13 is made, a circuit is then closed through C14—C13—C18—C17 which holds the relays R3 and R5 closed by application of the D.-C. voltage on line 802. This condition continues until relay R4 operates, at which time the D.-C. voltage is removed from relays R3 and R5 by the opening of contacts C17—C18. Relays R3 and R5 are then deenergized. As soon as the contact C14—C13 is opened, the D.-C. voltage on line 802 is disconnected from line 806** and relay R4 thus becomes deenergized. When the contacts C17 and C18 of relay R4 have returned to the normal rest position, the circuit is back in its original state and the gating cycle has been completed.

In the type of relay accumulator register shown in Fig. 8, the stages are set up to perform the carry function at the same time their states are changed from "0" to "1." Thus the carry function is performed simultaneously with the reception of the next pulse which changes their states from "1" to "0."

If reference is now made to Fig. 7 it will be seen that the gate control circuit 703 is equivalent to relay arrangement **703*b* in Fig. 8, that any stage 711 in Fig. 7 is equivalent to any stage 711*b* in Fig. 8, that delay element 107*a* in Fig. 7 is equivalent to delay element 107*b* in Fig. 8, and that the gate circuits 701 and 702 in Fig. 7 are equivalent to gate circuit 803 in Fig. 8. Wire 805 in Fig. 8 performs the same function (gate switching) as do wires 704 and 705** in Fig. 7. Thus the operation of the relay embodiment of the invention disclosed in Fig. 8 needs no further description.

It is obvious that in the construction, operation, and application of the invention, manifold changes may be made in the precise form and arrangement of the parts thereof.

While we have shown and described two embodiments of our invention, we wish it to be understood that we do not confine ourselves to the precise details of construction herein set forth by way of illustration, as it is apparent that many changes and variations may be made therein, by those skilled in the art, without departing from the spirit of the invention or exceeding the scope of the appended claims.

Having thus described our invention, what we claim as new and desire to secure by Letters Patent is:

1. In a relay binary digital computer, an accumulator register having a plurality of digital stages, a delay element connected between each two successive stages, and a plurality of relay gates connected between each two successive stages except the lowest two, one of said gates being in circuit with said delay element and another of said gates being connected in parallel therewith, together with control means for causing first carry signals between said successive stages to pass through said delay element and second carry signals to pass through said another gate, bypassing said delay element.

2. An accumulator register having a plurality of bi-stable devices, one for each digit space in the register, delay elements connected to pass carry impulses between each successive pair of bi-stable devices, and means between each of said pairs of bi-stable devices above the lowest pair for passing carry impulses from one device directly to the next higher device without passing through a delay element.

3. In a digital computer, an accumulator register comprising a plurality of bi-stable devices, a plurality of gating devices connected in parallel between each adjacent pair of said bi-stable devices above the lowest pair and a delay element connected in series with one of said gating devices between each of said pairs, with the addition of means for controlling said delay elements and means between each pair of devices above the lowest pair to cause a first carry signal between said pairs of devices to pass through the delay element and cause a second carry signal to bypass the delay element.

4. An accumulator register having a plurality of bi-stable devices, means including a delay element for passing a carry signal between adjacent devices from the lower device to the higher one, and means for passing a carry signal between each two adjacent devices above the lowest device bypassing said delay element.

5. In a binary register, a plurality of bi-stable devices, one for each digit space within the capacity of the register, means for transmitting to said register simultaneously a plurality of signals representing the addition of a value to the contents of said register, connections between adjacent devices for transmitting a carry signal from the device in the lower denominational order to the device in the next higher of said adjacent devices, delay means interposed in said connections, and other connections between each two adjacent devices above the lowest one for transmitting a carry signal from said device in the lower denominational order to said device in the next higher denominational order device without being delayed by said delay means.

6. In a computer, an accumulator register having a plurality of bi-stable devices, one for each digit space in the register, connections to each of said devices for transmitting to them simultaneously signals representing the addition of a value to the contents of said register, means for passing a carry signal resulting from the addition from any device to the next higher device, means for delaying said signal until said higher device has settled down from any change produced in it by the addition and means for passing a subsequent carry signal produced in any of said devices as a result of said first mentioned carry to the next higher device without passing through said delaying means.

7. In a binary computer, an accumulator register having a plurality of stages, one for each digit within the capacity of the register, connecting means, including a delay element for transmitting a carry signal from each lower stage of the register to the next higher stage, a gating device included in said connecting means between each pair of adjacent stages above the lowest pair, and a second gating device connected in parallel with each of said first-mentioned gating devices between the same points in each of said last-mentioned pairs of stages bypassing said delay elements.

8. In a binary computer, an accumulator register having a plurality of stages, one for each digit within the capacity of the register, gating devices having a conductive condition and a non-conductive condition, delay elements, means connecting a first gating device and a delay element in circuit therewith between each pair of stages above the lowest pair and means connecting a second gating device in parallel with said first gating device between the same points in each of said last-mentioned pairs of stages bypassing said last mentioned delay element.

9. The structure of claim 8 with said first gating devices and said second gating devices connected together for operation as two separate groups, control means connected to operate said groups in unison and holding one group of gating devices in conductive condition and the other group in non-conductive condition, and means to actuate said control means and shift the conductive condition of both groups of gates simultaneously to the reverse condition.

10. In a binary computer, an accumulator register having a plurality of stages, one for each digit within the capacity of the register, connections for adding a value to each stage simultaneously by the parallel addition process, connections between each two successive stages for transmitting to the higher stage a signal of any carry from the lower stage caused by the parallel addition, a means interposed in said connections to delay said carry signal until said next higher stage has settled down from any change therein caused by said parallel addition, and means for transmitting from each intermediate stage above the first stage to the next higher stage a signal of any carry resulting from a carry, bypassing said delay means.

11. In a digital computer, an accumulator register having a plurality of digital stages, gating devices connected to pass carry signals from each intermediate stage to the next higher stage, second gating devices each having a delay element in circuit therewith also connected to pass carry signals from each intermediate stage to the next higher stage through said delay elements, means connecting said first mentioned gating devices and said second gating devices together for operation as two separate groups, and means controlling said gating devices to pass carry signals occurring at one instant through one only of said groups of gates.

12. In a binary digital computer, an accumulator register having a plurality of digital stages, gating devices having a conductive condition and a non-conductive condition, means connecting one of said gating devices and a delay element in series therewith between points in each two adjacent stages above the lowest one, a second gating device connected between the same points in each of the last mentioned adjacent stages, and control means for simultaneously changing the conductive condition of both said first mentioned gating devices and said second gating devices to the reverse condition.

13. In a digital computer, an accumulator register having a plurality of bi-stable devices, connections to said bi-stable devices for transmitting to them simultaneously signals representing the addition of a value to the contents of said register, a pair of gating devices having a conductive and a non-conductive condition connected in parallel between each pair of said bi-stable devices above the lowest pair, a delay element connected in series with one gating device of each pair, and control means for simultaneously shifting the condition of conductivity from one gating device of each pair to the other.

14. A carry control circuit for passing carry signals simultaneously from each intermediate denominational order of an accumulator register to the next higher order comprising a bi-stable device in each order, a pair of gating devices connected to each of said intermediate bi-stable devices, delay devices, means connecting one of said delay devices between one gating device of each pair and a given point in the next higher bi-stable device, means connecting the other gating device of each pair to the same given point in said next higher bi-stable device, means connecting all of said one gating devices together in one group, means connecting all of said other gating devices together in another group, and control means for holding said one group of gating devices in one condition of conductivity and said other group of gating devices in the other condition of conductivity and for simultaneously changing both groups of gating devices to the reverse condition.

15. A carry control circuit for passing carry signals from each intermediate stage of an accumulator register to the next higher stage comprising delay elements timed to delay the passage of a carry signal until said next higher stage has settled down from a change of condition required by the addition of a value thereto, means connecting one of said delay elements between terminals on each said intermediate stage and the next higher stage for passing a carry signal through said delay element, second connecting means connected to the same terminals as said first connecting means for passing a carry signal from each said intermediate stage to said next higher stage bypassing said delay element, means joining said connecting means together for group operation, and means controlling said connecting means to cause first carry signals to pass simultaneously through said delay elements to said next higher stages, and to cause second carry signals from each said intermediate stage to pass directly to said next higher stage, avoiding said delay elements.

16. In a binary computer, an accumulator register having a plurality of digital stages, a pair of gates having a conductive condition and a non-conductive condition connected in parallel between each two adjacent stages above the lowest stage, a delay device in circuit with one gate of each pair, a control device for changing the conductive condition of said gates, said control device having two output terminals, means connecting that gate of each pair having the delay device in circuit therewith to one of said terminals, means connecting the other gate of each pair to the other of said terminals, and means for actuating said control device to change said gates simultaneously to their reverse condition of conductivity.

17. In an electronic computer, an accumulator register having a plurality of digital stages, an electronic gate and a delay element connected in series between each pair of stages in adjoining denominational orders of said register above the lowest pair to form a path for the passage of a carry impulse from the lower to the higher stage of each pair, and means connecting an additional gate between said each pair of stages above the lowest pair, and forming an alternate path for the passage of a carry impulse from said lower stage to said higher stage of each pair above the lowest pair, bypassing said delay element.

18. The structure of claim 17 with the addition of control means for causing the carry due to the addition of a value to any of said lower stages to pass through said delay element to said higher stage and causing the carry due to the receipt in any stage of said first mentioned carry to pass through said alternate path, bypassing said delay element.

(References on following page)

References Cited in the file of this patent

UNITED STATES PATENTS

| | | |
|---|---|---|
| 2,191,567 | Hofgaard | Feb. 27, 1940 |
| 2,364,540 | Luhn | Dec. 5, 1944 |
| 2,394,925 | Luhn | Feb. 12, 1946 |
| 2,428,990 | Rajchman | Oct. 14, 1947 |
| 2,462,275 | Morton | Feb. 22, 1949 |
| 2,510,485 | Vossberg | June 6, 1950 |
| 2,523,244 | Woodward | Sept. 19, 1950 |
| 2,539,623 | Heising | Jan. 30, 1951 |
| 2,560,600 | Schafer | July 17, 1951 |
| 2,577,141 | Mauchley et al. | Dec. 4, 1951 |
| 2,585,630 | Crosman | Feb. 12, 1952 |
| 2,637,812 | Hagen | May 5, 1953 |
| 2,700,503 | Crosman | Jan. 25, 1955 |
| 2,700,504 | Thomas | Jan. 25, 1955 |
| 2,706,597 | Crosman | Apr. 19, 1955 |

OTHER REFERENCES

Third Interim Progress Report on the Physical Realization of an Electronic Computing Instrument, Inst. for Advanced Study at Princeton, N. J., January 1948, pages 130 through 135.

Fourth Interim Progress Report on the Physical Realization of an Electronic Computing Instrument, Inst. for Advanced Study at Princeton, N. J., July 1948, pages II–11, II–11c, II–12.

Electrical Engineering, November 1949, "The binary quantizer," pages 962–967.

Proc. of the IRE, December 1948, "A digital computer for scientific purposes," by West et al. (pages 1452 to 1460).

Electronics Engineering, December 1950, "The physical realization of an electronic digital computor," by A. D. Booth, pages 492 to 498.

Electronics Engineering, December 1950, "An electrical digital computer," pages 492–498.